United States Patent [19]

Chyung et al.

[11] Patent Number: 4,615,987

[45] Date of Patent: Oct. 7, 1986

[54] REINFORCEMENT OF ALKALINE EARTH ALUMINOSILICATE GLASS-CERAMICS

[75] Inventors: Kenneth Chyung, Painted Post; Reid F. Cooper, Odessa; Kishor P. Gadkaree, Painted Post; Ronald L. Stewart, Big Flats; Mark P. Taylor, Painted Post, all of N.Y.

[73] Assignee: Corning Glass Works, Corning, N.Y.

[21] Appl. No.: 723,572

[22] Filed: Apr. 15, 1985

[51] Int. Cl.⁴ .................. C03C 10/06; C03C 14/00; C04B 35/56

[52] U.S. Cl. ................................. 501/8; 501/32; 501/89; 501/95

[58] Field of Search .............. 501/8, 32, 89, 95; 428/697

[56] References Cited

U.S. PATENT DOCUMENTS

| | | | |
|---|---|---|---|
| 3,531,303 | 9/1970 | Bahat | 501/8 |
| 3,713,854 | 1/1973 | Beall | 501/9 |
| 3,772,041 | 11/1973 | Tochon | 501/8 |
| 4,187,115 | 2/1980 | Reade | 501/8 |
| 4,324,843 | 4/1982 | Brennan et al. | 428/697 |
| 4,410,635 | 10/1983 | Brennan et al. | 501/8 |
| 4,463,058 | 7/1984 | Hood et al. | 501/32 |
| 4,464,192 | 8/1984 | Layden et al. | 428/367 |
| 4,464,475 | 8/1984 | Beall et al. | 501/8 |

Primary Examiner—Mark L. Bell
Attorney, Agent, or Firm—C. S. Janes, Jr.

[57] ABSTRACT

The present invention is directed to SiC whisker and/or fiber reinforced glass-ceramic matrix composite articles wherein an alkaline earth aluminosilicate constitutes the predominant crystal phase. More particularly the composite articles will consist essentially of 10–60% by weight SiC whiskers and/or 15–70% by volume ceramic fibers and the glass-ceramic matrix will consist essentially, by weight on the oxide basis, of

| | | | |
|---|---|---|---|
| CaO | 0–25 | MgO | 0–15 |
| SrO | 0–30 | $Na_2O$ | 0–4 |
| CaO + SrO | 10–30 | $K_2O$ | 0–6 |
| $Al_2O_3$ | 25–38 | $TiO_2$ | 0–12 |
| $SiO_2$ | 35–60 | $ZrO_2$ | 0–15 |
| BaO | 0–25 | $As_2O_3$ | 0–3 |
| BaO + MgO + $Na_2O$ + $K_2O$ + $TiO_2 ZrO_2$ + $As_2O_3$ | | | 0–30 |

The preferred predominant crystal phase is selected from the group of anorthite and its pseudo-binaries, with mullite, cordierite, barium osumilite, and albite solid solution.

3 Claims, No Drawings

REINFORCEMENT OF ALKALINE EARTH ALUMINOSILICATE GLASS-CERAMICS

BACKGROUND OF THE INVENTION

The use of inorganic whiskers and fibers to reinforce glasses, glass-ceramics, sintered ceramics, plastics, and metals has long been practiced. Commonly, the term whiskers has been applied to elongated, single-crystal fibers. In general, whiskers have been described as having a thickness less than about 100 microns with a length-to-diameter ratio of at least 100.

Whiskers have found extensive use as reinforcing agents in various matrices because of their inherent shape, high modulus of elasticity, and high tensile strength. To illustrate, when dispersed in a crystalline matrix, the anisotropic, fiber-like configuration of whiskers strongly inhibits their movement to the grain boundaries of the crystals, thereby significantly improving the creep resistance of the material. Also, the high elastic modulus and tensile strength of many different whiskers enables them to produce composite products demonstrating superior strength-to-weight and stiffness-to-weight properties. For example, whiskers prepared from very stiff, low density covalent compounds such as carbides, nitrides, and oxides can exhibit elastic moduli higher than most metals and are often many times stronger than steel, when considered in proportion to their weight.

In contrast to whiskers, fibers are generally deemed to be multicrystalline or amorphous. Extensive study to understand the basic means underlying the strengthening improvement to composite bodies imparted by the fibers has indicated the mechanism to be that of load transfer by the matrix to the fibers through shear. This load transfer takes place near the ends of the fibers within a distance of a few fiber diameters.

The basic strengthening mechanism is believed to be the same in whisker-containing composites, but the amount of load transferred by the matrix to the whiskers is dependent upon the length and aspect ratio of the whisker. Hence, the whisker may not be loaded to the breaking stress and, consequently, full advantage cannot be taken of its reinforcing capability. In addition to the length and aspect ratio of the whisker, orientation of the whisker with respect to the applied stress and the stress concentrations at the ends of the whisker result in lower strength than would be possible with fibers. Accordingly, whisker reinforced composites will typically manifest lower mechanical properties than unidirectionally-oriented, continuous fiber composites fabricated from like constituents (when properties are measured along the fiber axis). Whisker-containing composites possess an advantage, however, over the continuous fiber-containing composites in that they are macroscopically isotropic.

Glass-ceramics had their genesis in U.S. Pat. No. 2,920,971. As is explained therein, glass-ceramics are prepared through the controlled in situ crystallization of precursor glass bodies. Production of glass-ceramic articles commonly comprises three basic steps: (1) a glass batch of a desired composition is melted; (2) the melt is cooled to a temperature at least within and, normally, below the transformation range of the glass and a glass article of a predetermined configuration shaped therefrom; and (3) the glass article is exposed to a predetermined heat treatment schedule to cause the glass to crystallize in situ. Customarily, temperatures greater than the annealing point of the glass will be employed in the crystallization heat treatment, with temperatures approaching and exceeding the softening point of the glass not being unusual.

SiC fibers and whiskers have been demonstrated as reinforcing agents in numerous metal and non-metal matrices. For example, U.S. Pat. No. 4,324,843 records the formation of SiC fiber reinforced glass-ceramic composite bodies wherein the glass-ceramic matrix is selected from the composition systems of aluminosilicate, lithium aluminosilicate, magnesium aluminosilicate, and combinations thereof. U.S. Pat. No. 4,464,475 discloses the production of SiC fiber reinforced glass-ceramic composite bodies wherein barium osumilite constitutes the predominant crystal phase. U.S. Pat. No. 4,464,192 describes the preparation of SiC whisker reinforced glass and glass-ceramic composite bodies wherein the glass-ceramic matrix is selected from the group of lithium aluminosilicate, magnesium aluminosilicate, aluminosilicate, and combinations thereof.

The above matrices are asserted to be suitable for use temperatures in the range of about 1000°-1300° C. Above that temperature range those compositions are not refractory enough to provide a viscosity sufficiently high to transfer load to reinforcing fibers and whiskers. Consequently, the matrix deforms excessively and the composite suffers loss of load-bearing ability.

SUMMARY OF THE INVENTION

The present invention is designed to produce SiC whisker and fiber reinforced glass-ceramic composite articles capable of being used at temperatures up to 1300° C. and, in some instances, up to 1400° C. The inventive products utilize glass-ceramic matrices wherein an alkaline earth aluminosilicate comprises the predominant crystal phase. In the preferred embodiment, anorthite, triclinic $(CaO,SrO).Al_2O_3.2SiO_2$, or its pseudo-binaries with mullite $(3Al_2O_3.2SiO_2)$, cordierite $(2MgO.2Al_2O_3.5SiO_2)$, barium osumilite $(BaO.2MgO.3Al_2O_3.9SiO_2)$, and albite solid solution $(Na_2O.Al_2O_3.6SiO_2)$ will constitute at least a major portion of the crystal phase. Such glass-ceramic bodies are oxidation resistant, thermochemically compatible with SiC fibers and whiskers, and creep resistant to temperatures above 1300° C., with certain compositions being capable of service at a temperature of 1400° C. Base compositions therefor, expressed in terms of weight percent on the oxide basis, consist essentially of 0–25% CaO, 0–30% SrO, 10–30% CaO+SrO, 25–38% $Al_2O_3$, and 35–60% $SiO_2$. Optional components include up to 25% BaO, up to 15% MgO, up to 4% $Na_2O$, up to 6% $K_2O$, up to 3% $As_2O_3$, up to 15% $ZrO_2$, and up to 12% $TiO_2$.

Various combinations of crystal phases other than those described above can be developed in the inventive products such as, for example, anorthite with $Al_2O_3$, anorthite with $SiO_2$, anorthite with $CaO.SiO_2$, anorthite with gehlenite $(2CaO.Al_2O_3.SiO_2)$, and strontium anorthite with albite solid solution.

Because SiC whiskers are so small in cross section, but present a high aspect ratio, they are always received from a supplier in agglomerated form. The presence of whisker agglomerates in a composite body results in improper consolidation of the body with consequent weak spots therein. Accordingly, it is necessary to break up the agglomerates and provide a uniform dispersion of the whiskers within the matrix materials. U.S. Pat. No. 4,463,058 describes a technique for deagglomerating SiC whiskers comprising: forming a slurry of the whiskers with a polar liquid; stirring the slurry; and then ball milling the slurry. The matrix material is thereafter blended into the slurry and mixture dried. We have found the use of a shear mixer to be particularly effective in breaking up the agglomerates of whiskers and uniformly dispersing the whiskers in the matrix material. For example, a slurry of whiskers in a polar liquid can be blended for a few minutes in a shear mixer; a predetermined amount of matrix material added; mixing continued for a few minutes; and the mixture dried or otherwise prepared for a shaping process.

Forming methods conventional in the ceramic art are likewise operable here with the inventive composite bodies. Such methods include extrusion, dry pressing, injection molding, hot pressing, and hot isostatic pressing. The consolidation conditions, however, are quite important. It is apparent that in the latter two forming means consolidation and crystallization may be undertaken simultaneously with forming, but will be carried out subsequent to forming in the former three shaping methods.

In general, a nucleation agent, e.g., $TiO_2$, will not be included in the compositions. Instead, the precursor matrix glass will normally be comminuted to very finely-divided particles, viz., particles having an average size less than 10 microns, and surface nucleation relied upon. Because of that crystallization mechanism, processing the mixture at temperatures above the liquidus temperature of the precursor glass hazards the development of a glassy matrix or a matrix containing undesirable crystal phases and residual glass. The presence of glass is detrimental to the refractory nature of the composite.

As would be expected, the physical characteristics manifested by the inventive composites are a function of whisker geometry, whisker content, and processing conditions. We have found that excellent reinforcement of matrices can be achieved with whiskers having thicknesses of less than 100 microns with length-to-diameter ratios of at least 10. Increasing the proportion of whiskers generally results in composites exhibiting greater mechanical strength. Whereas some effect upon the properties of a composite can be observed at lower centents of whiskers, typical loadings will range between about 10-60% by weight.

Higher firing temperatures are desirable to achieve more rapid consolidation and freedom from voids and/or other porosity. Nevertheless, as has been noted above, care must be exercised to avoid a consolidation temperature so high that a glassy matrix develops which cannot be crystallized to the desired crystalline assemblage. Hence, fracture toughness goes through a maximum value as the processing temperature is raised through and passed an optimum for consolidation. Typical temperatures for consolidation range about 1300°-1550° C.

SiC whiskers may be utilized in conjunction with continuous ceramic fibers, e.g., SiC, BN, $B_4C$, $ZrO_2$, zircon, graphite, mullite, spinel, glass, or $Al_2O_3$, to produce composite bodies. Thus, for example, the whiskers can be blended into a glass frit as described above, that mixture combined with the continuous fibers to form oriented prepregs, the prepregs stacked, and then hot pressed or isostatically pressed at elevated temperatures to achieve consolidation of the composite. In general, the fiber contents will range about 15-70% by volume.

When compared with composites prepared from continuous fibers alone, the inclusion of whiskers not only raises the elastic modulus of the composite, but also enhances the matrix microcracking strain. This improvement in microcrack strain and stress is of vital significance because it is believed that the microcrack stress-strain point may constitute the design limit for composites. Further, the transverse strength (corresponding to fractures running parallel to the continuous fibers) is substantially increased. This factor reduces fatigue and delamination effects.

The formation of composite bodies containing SiC fibers has been disclosed in the above-mentioned U.S. Pat. Nos. 4,324,843 and 4,464,475, among others. The methods described therein are equally applicable with the anorthite $[(CaO,SrO).Al_2O_3.2SiO_2]$-containing glass-ceramics discussed above to yield products capable of use at temperatures up to 1400° C.

Where a composite containing discontinuous SiC fibers is desired, the fibers can be chopped to paper length (~1-3 cm) through conventional means and formed into sheets by means of known papermaking techniques. Whereas the SiC paper will typically be stacked isotropically; i.e., an approximately equivalent number of fibers oriented in-plane in every direction; the fiber lay-up may be biased in a particular in-plane direction when it is known that the formed article will be stressed primarily in a single direction.

Finally, a composite containing both whiskers and fibers can be prepared through a combination of the method outlined above for forming whisker-containing composites with the general methods disclosed in the prior art for fabricating fiber-containing composites. Typically, the total content of fibers+whiskers will not exceed about 70% by weight.

PRIOR ART

U.S. Pat. No. 3,531,303 discloses the formation of glass-ceramic articles wherein a hexagonal alkaline earth feldspar comprises the predominant crystal phase and where, occasionally, a triclinic alkaline earth feldspar is found in substantial quantities. The articles consist essentially, in weight percent on the oxide basis, of 0-35% CaO, 0-53% SrO, 0-55% BaO, 10-55% CaO+SrO+BaO, 10-58% $Al_2O_3$, and 12-53% $SiO_2$ with a nucleating agent selected from the group of ZnS, $V_2O_5$, $MoO_3$, $CaF_2$, $WO_3$, NiO, Au, Pt, Rh, Pd, Ir, and $Fe_2O_3$+FeO. Heat treatments suitable for converting the precursor glass into a glass-ceramic range between 850°-1700° C. No mention is made of forming SiC whisker or fiber reinforced composite articles, so there is no description of the limited ranges of CaO and/or SrO, $Al_2O_3$, and $SiO_2$ required and the consolidation temperatures that must be observed to produce composites exhibiting the desired properties.

U.S. Pat. No. 4,187,115 discloses the preparation of glass-ceramic articles wherein the crystal phase consists essentially of triclinic anorthite and rutile. The articles consist essentially, in weight percent on the oxide basis, of 10-18% CaO, 29-35% $Al_2O_3$, 30-39% $SiO_2$, and 13-20% $TiO_2$. Up to 10% total of the following ingredients in the indicated proportions may optionally be included: up to 3% MgO, up to 10% SrO, up to 5% BaO, up to 7% PbO, up to 5% CdO, up to 6% $P_2O_5$, and up to 1.5% F. Crystallization temperatures of 1000°-1400° C. are stated to be operable. There is no reference to SiC whisker or fiber reinforced composites or any discussion of the specific regimes of CaO and/or SrO, Al₂O₃, and SiO₂ required and the consolidation temperatures necessary to produce composites having the desired properties.

DESCRIPTION OF PREFERRED EMBODIMENTS

Table I records a group of thermally crystallizable glass compositions, expressed in terms of parts by weight on the oxide basis, which, when subjected to the heat treatment practice of the present invention, will crystallize in situ to fine-grained glass-ceramic articles wherein the crystals are relatively uniform in size. Inasmuch as the sum of the reported constituents totals or approximately totals 100, for all practical purposes the values tabulated for the individual components may be considered to reflect weight percent. The actual batch ingredients may comprise any materials, either oxides or other compounds, which, upon being melted together, will be converted into the desired oxide in the proper proportions.

The batch components were compounded, ball milled together to assist in securing a homogeneous melt, and charged into platinum crucibles. The crucibles were covered, introduced into a furnace operating at about 1650° C., and the batches melted for about 16 hours without stirring. The melts were poured as a relatively fine stream into a container of water to yield finely-divided particles of glass which, after drying, were comminuted to particles having an average particle size less than 10 microns. To insure the elimination of any tramp large particles, the material was passed through a No. 100 United States Standard Sieve (149 microns).

Table I also reports various physical properties measured on 4"×¼"×¼" bars dry pressed from the powders after being exposed to 1300° C. for 1-2 hours to effect sintering of the particles into an integral body and crystallization in situ thereof. The degree of sinterability of each example was determined in terms of linear shrinkage (% Shrink). Coefficients of thermal expansion (Exp.) were measured over the 25°-900° C. range in terms of $10^{-7}/°C$. Finally, refractoriness was determined utilizing beam bending viscosity measurement of the sintered compact. The temperatures of $10^{12}$, $10^{13}$, and $10^{14}$ poises (p) are tabulated in °C. In general, the temperature at $10^{13}$ poises is often associated with the range of maximum use temperature.

TABLE I

|  | 1 | 2 | 3 | 4 | 5 | 6 | 7 | 8 |
|---|---|---|---|---|---|---|---|---|
| SiO₂ | 43.2 | 42.1 | 41.0 | 42.8 | 42.0 | 48.7 | 46.5 | 40.3 |
| Al₂O₃ | 36.7 | 38.3 | 39.5 | 36.3 | 39.5 | 35.5 | 35.9 | 34.3 |
| CaO | 20.1 | 19.3 | 18.5 | 19.9 | 18.5 | 6.5 | 11.9 | 15.1 |
| MgO | — | — | — | — | — | 9.3 | 5.9 | — |
| BaO | — | — | — | — | — | — | — | 10.3 |
| As₂O₃ | — | — | 1.0 | 1.0 | — | — | — | — |
| % Shrink | 17.4 | 19.4 | — | — | 17.8 | 17.4 | 18.6 | 19.0 |
| Exp. | — | — | — | — | — | 29.6 | 39.4 | 45.3 |
| $10^{14}$p | 1262 | — | 1289 | — | 1296 | — | — | 1232 |
| $10^{13}$p | 1316 | — | 1362 | — | 1334 | — | — | 1282 |
| $10^{12}$p | 1369 | — | 1419 | — | 1373 | — | — | 1333 |

|  | 9 | 10 | 11 | 12 | 13 | 14 | 15 | 16 |
|---|---|---|---|---|---|---|---|---|
| SiO₂ | 37.9 | 36.7 | 42.4 | 41.7 | 41.1 | 40.4 | 39.8 | 44.5 |
| Al₂O₃ | 32.2 | 31.2 | 36.1 | 35.5 | 34.9 | 34.3 | 33.8 | 30.9 |
| CaO | 10.6 | 8.6 | 17.8 | 15.6 | 13.5 | 11.9 | 9.3 | 15.1 |
| BaO | 19.4 | 23.5 | — | — | — | — | — | — |
| SrO | — | — | 3.7 | 7.2 | 10.6 | 13.9 | 17.2 | — |
| Na₂O | — | — | — | — | — | — | — | 2.1 |
| TiO₂ | — | — | — | — | — | — | — | — |
| % Shrink | 18.2 | 15.8 | 18.6 | 18.2 | 18.2 | 18.2 | 16.4 | 7.5 |
| Exp. | 46.2 | 43.5 | 51.8 | 50.8 | 51.4 | 49.0 | — | — |
| $10^{14}$p | 1278 | 1256 | 1197 | 1232 | 1249 | — | — | — |
| $10^{13}$p | 1324 | 1310 | 1257 | 1291 | 1304 | — | — | — |
| $10^{12}$p | 1370 | 1365 | 1317 | 1349 | 1359 | — | — | — |

|  | 17 | 18 | 19 | 20 | 21 | 22 | 23 |
|---|---|---|---|---|---|---|---|
| SiO₂ | 37.7 | 39.8 | 35.3 | 40.5 | 41.0 | 41.0 | 43.2 |
| Al₂O₃ | 26.2 | 27.6 | 27.1 | 29.6 | 39.9 | 39.9 | 36.7 |
| CaO | — | — | — | — | 19.1 | 19.1 | 20.1 |
| SrO | 23.7 | 25.0 | 26.1 | 27.6 | — | — | — |
| Na₂O | 1.8 | 1.9 | 1.9 | — | — | — | — |
| K₂O | — | — | — | 2.2 | — | — | — |
| TiO₂ | 10.7 | 5.7 | 10.7 | — | — | — | — |
| As₂O₃ | — | — | — | — | 0.5 | — | 0.5 |
| % Shrink | — | — | — | — | — | — | — |
| Exp. | — | — | — | — | — | 50.2 | — |
| $10^{14}$p | — | — | — | — | 1305 | 1327 | 1172 |
| $10^{13}$p | — | — | — | — | 1350 | 1373 | 1236 |
| $10^{11}$p | — | — | — | — | 1396 | 1420 | 1301 |

Table I illustrates that some of the most refractory compositions include Example 1 (stoichiometric anorthite), Examples 3, 21, and 22 with excess Al₂O₃ over anorthite stoichiometry, and Example 9 (60% by weight anorthite-40% by weight BaO.Al₂O₃.2SiO₂,) with $10^{13}$ poise points of 1316° C., 1362° C., 1350° C., 1373° C. and 1324° C., respectively.

It is of particular interest to observe the refractoriness of compositions containing Al₂O₃ in excess of stoichiometric anorthite, viz., Examples 2, 3, 21, and 22. Especially preferred compositions are located near the eutectics of anorthite-mullite and anorthite-Al₂O₃ pseudo boundaries. The excess level of Al₂O₃ insures the eutectic temperature of ~1540° C., as compared to those eutectic temperatures of anorthite-SiO₂(1368° C.), anorthite-CaO.SiO₂(1300° C.), and anorthite-gehlenite (1380° C.).

It is also of significance to note that the extremely refractory strontium anorthite could be melted at 1650° C. when albite was present in an amount of 10-20 mole percent (Examples 17-20). Anorthite-albite solid solution (Example 16) is also noteworthy because of its superior glass stability when compared with stoichiometric anorthite; its capability of crystallizing internally with 6-12% by weight of TiO₂; and its capability of undergoing deformation twinning which has the salutary effect of increasing fracture strain.

Formation of Composite Articles Containing SiC Whiskers

To 150 ml distilled water and 50 ml isopropanol in a Waring blender were added 3 grams of SiC whiskers and the blender then energized for five minutes to deagglomerate the whiskers and produce a uniform suspension. The SiC whiskers utilized had diameters of about 1 micron or somewhat less and lengths of about 40-50 microns. To that mixture were added seven grams of the above glass powders and the blending continued for another five minutes. The suspension was thereafter vacuum-filtered utilizing a Buechner funnel. That sequence of steps can be repeated as many times as necessary to obtain a predetermined amount of the composite filter cake. The filter cake was then dried and hot pressed in a graphite mold. This practice permits the whisker-glass ratio and the water-isopropanol ratio to be changed as desired.

Furthermore, as can be appreciated, polar liquids other than water may be employed but to no substantive advantage. Finally, where desired, a binder soluble in water or other polar liquid may be included in the mixture to improve the green (unfired) strength of the dried bodies. A polyethylene-glycol binder or a polyvinyl acetate binder are illustrative of such practice.

A range of temperatures and pressures can be utilized in conventional hot pressing techniques; it being appreciated that the forming operation will be conducted at temperatures at which the precursor glass frit manifests a maximum viscosity below about $10^{13}$ poises (and below the liquidus of the glass).

Table II reports five thermally crystallizable glass compositions, expressed in terms of parts by weight on the oxide basis, which, when subjected to the heat treatment practice of the present invention, will crystallize in situ to relatively uniform fine-grained glass-ceramic articles. Because the sum of the individual components totals or closely approaches 100, for all practical purposes the tabulated values may be deemed to represent weight percent. The specific batch ingredients may comprise any materials, either oxides or other compounds, which, upon being melted together, will be converted into the desired oxide in the proper proportions.

The batch constituents were compounded, ballmilled together, melted in platinum crucibles, the melt run as a fine stream into water, and the resulting particles dried and comminuted to particles having an average size less than 10 microns in like manner to the compositions recorded above in Table I.

Upon heat treatment, Examples 24 and 25 form barium osumilite as the predominant crystal phase, Example 26 contains barium-stuffed cordierite as the predominant crystal phase, and Examples 27 and 28 contain anorthite as the predominant crystal phase with a high proportion of cordierite also present.

TABLE II

|  | 24 | 25 | 26 | 27 | 28 |
|---|---|---|---|---|---|
| $SiO_2$ | 50.63 | 53.2 | 43.66 | 45.6 | 48.1 |
| $Al_2O_3$ | 27.66 | 25.0 | 37.11 | 36.2 | 35.6 |
| BaO | 13.27 | 12.5 | 6.20 | — | — |
| CaO | — | — | — | 14.1 | 8.1 |
| MgO | 3.44 | 8.4 | 13.03 | 4.4 | 8.3 |
| $As_2O_3$ | 1.0 | 1.0 | 0.70 | 0.5 | 0.5 |

Homogenous suspensions containing varying amounts of SiC whiskers were prepared from those five frits and from frit obtained from Example 21, utilizing the above-described shear mixing technique. The dried material was charged into graphite molds having molybdenum metal liners. The molds were transferred to a resistance-heated press and the material consolidated for 30 minutes at the sintering temperatures and loads reported in the following tables, employing a nitrogen atmosphere. Temperatures were controlled and measured utilizing a tungsten-5% rhenium vs. tungsten-26% rhenium thermocouple placed in the mold within 1 cm of the charge. Modulus of rupture (MOR), expressed in terms of psi, was measured on standard bars utilizing the conventional four point bend procedure, and fracture toughness ($K_{IC}$), expressed in terms of MPam$^{\frac{1}{2}}$, was measured on single edge notched beams in four point loading in the conventional manner. Those values are also recorded, where measured, as are the crystal phases present, as determined through X-ray diffraction analyses. The phases are tabulated in the order of their proportion in the body.

TABLE III

Effect of Hot Pressing Conditions of Example 24 Composite Properties

| Whiskers | Pressing Conditions | Crystal Phases | MOR | $K_{IC}$ |
|---|---|---|---|---|
| 24 wt. % | 1350° C., 1500 psi | Osumilite | 34,000 | 4 |
| 24 wt. % | 1400° C., 1500 psi | Cordierite, Celsian, Glass | 41,000 | 6 |
| 24 wt. % | 1450° C., 1500 psi | Mostly glass, Mullite, Barium aluminosilicate | 36,500 | 3.2 |
| 30 wt. % | 1350° C., 1500 psi | Osumilite | 42,000 | 5 |
| 30 wt. % | 1400° C., 1500 psi | Cordierite, Celsian, Glass | 47,000 | 5 |
| 30 wt. % | 1450° C., 1500 psi | Mostly glass, Mullite, Barium aluminosilicate | 49,500 | 3.6 |
| 35 wt. % | 1450° C. 1500 psi | Mostly glass, Mullite, Barium aluminosilicate | 54,000 | 3.6 |

It is immediately evident from a study of Table III that an increase in whisker content effects higher MOR levels at given hot pressing conditions. Furthermore, higher pressing temperatures can lead to different matrix phase assemblages and also to better consolidation of the overall body. Table III would seem to indicate that a pressing temperature in the vicinity of 1400° C. is optimum for compositions similar to Example 24, since the combinations of MOR and $K_{IC}$ are better than the values obtained at 1350° C. and 1450° C. Table III affirms the statement above asserting that fracture toughness is a function of the type of matrix and the degree of consolidation. This is evidenced by the observation from Table III that fracture toughness increased from 4 to 6 for the 24% by weight composite pressed at 1350° C. and at 1400° C. where better consolidation is expected, but falls to 3.2 at 1450° C. where the matrix is mostly glassy in contrast to the highly crystalline matrices resulting at lower temperatures.

Table IV recites the MOR and $K_{IC}$ properties, as a function of the temperature at which the body was tested, manifested by a composite body consisting of 30% by weight SiC whiskers in a matrix composed of Example 25. The body was hot pressed at 1400° C. for 30 minutes under a load of 2000 psi, followed by a heat treatment for one hour at 1300° C. to insure complete crystallization. Whereas osumilite comprises the predominant crystal phase when Example 25 is crystallized at lower temperatures, after hot pressing at 1400° C. the bodies contained cordierite and celsian ($BaO \cdot Al_2O_3 \cdot 2SiO_2$) with some residual glass.

TABLE IV

| Temperature | MOR | $K_{IC}$ |
|---|---|---|
| 25° C. | 58,000 | 4.5 |
| 900° C. | 59,000 | 4.4 |
| 1000° C. | 49,600 | 7.4 |
| 1100° C. | 25,400 | 4.5 |
| 1200° C. | 7,800 | 1.3 |

As can be seen, the room temperature properties of the composite are maintained up to 900° C. The MOR drops at 1000° C. and, at 1200° C., substantial flow of the matrix occurred, that flow being believed to result from the residual glass in the matrix. Fracture toughness increased at 1000° C. due to flaw healing effects, it is conjectured, and drops at 1100° C. where cavitation is surmised to have taken place.

Table V reports the MOR and $K_{IC}$ properties, as a function of the temperature to which the body was tested, exhibited by a composite body consisting of 30% by weight SiC whiskers in a matrix comprised of Example 25. Because the body was hot pressed at 1350° C. for 30 minutes under a load of 2000 psi, followed by a heat treatment at 1300° C. for one hour, osumilite constituted the predominant crystal phase in the final product.

TABLE V

| Temperature | MOR | $K_{IC}$ |
|---|---|---|
| 25° C. | 38,100 | 2.9 |
| 900° C. | 30,500 | 2.9 |
| 1100° C. | 25,200 | 2.7 |
| 1200° C. | 19,200 | 2.9 |

When Tables IV and V are compared, a very significant drop in room temperature (~25° C.) MOR is evident in this composite consolidated at 1350° C. Hence, the consolidation of the body is apparently poor. Greatly improved consolidation could be had at 1350° C. utilizing much higher pressing loads. The fracture toughness, although lower than demonstrated when consolidated at 1400° C., remained essentially constant over the range of 25°-1200° C., thereby indicating very little residual glass in the matrix.

Table VI lists the hot pressing conditions to which composites of Examples 21 and 26-28 were subjected, as well as values of room temperature MOR (in psi) and fracture toughness (in MPam$^{\frac{1}{2}}$) along with the crystal phases present as identified through X-ray diffraction analyses.

TABLE VI

| Example | Whiskers | MOR | $K_{IC}$ | Crystal Phases |
|---|---|---|---|---|
| 21 | 24% | 35,000 | 4.1 | Anorthite |
| 21 | 30% | 53,800 | 5.0 | Anorthite |
| 26 | 24% | 39,500 | 4.6 | Cordierite, Barium Aluminosilicate |
| 26 | 30% | 51,000 | 5.1 | Cordierite, Barium Aluminosilicate |
| 26 | 35% | 40,000 | 5.1 | Cordierite, Barium Aluminosilicate |
| 26 | 40% | 43,000 | 5.1 | Cordierite, Barium Aluminosilicate |
| 26 | 30% | 37,000 | 4.2 | Glassy |
| 27 | 30% | 42,000 | 4.5 | Anorthite, Cordierite |
| 28 | 30% | 49,300 | 5.8 | Anorthite, Cordierite |

Whereas the glasses utilized in the production of the inventive composites customarily crystallize in situ to highly crystalline glass-ceramics during the consolidation step, as can be seen from the above a second heat treatment may optionally be applied to insure complete crystallization. Such second heat treatment may be conducted as part of the consolidation process or as a separate step. Temperatures of about 1100°-1300° C. will ordinarily be used.

Increases in MOR and fracture toughness through the inclusion of larger amounts of whiskers (24-30%) can be readily seen. In Example 26, however, whisker contents in excess of 30% by weight yielded reduced MOR and fracture toughness values. Such reductions are believed to be caused by poor consolidation of the composites. The essential glassiness of the matrix resulting from a consolidation temperature of 1475° C. clearly mandates the use of lower temperatures.

Table VII records the MOR, $K_{IC}$, and Young's modulus (reported in terms of $10^6$ psi), as a function of the temperature to which the body was tested, displayed by a composite body consisting of 30% by weight SiC whiskers in a matrix composed of Example 26. The composite was hot pressed at 1400° C. under a load of 1500 psi for 30 minutes followed by a heat treatment for one hour at 1300° C. to insure complete crystallization. Cordierite and barium aluminosilicate constituted the predominant crystal phases in the final product.

TABLE VII

| Temperature | MOR | $K_{IC}$ | Young's Modulus |
|---|---|---|---|
| 25° C. | 52,000 | 4.5 | 27 |
| 900° C. | 46,000 | 3.5 | 24.7 |
| 1100° C. | 38,400 | 3.4 | 23.4 |
| 1200° C. | 25,000 | 3.1 | — |

Formation of Composite Articles Containing SiC Fibers

The preparation of SiC fiber-containing glass-ceramic composite bodies is well known to the art. Numerous procedures have been practiced but, in the most basic terms, the overall method for such preparation comprises the following six general steps:

(1) a batch for a glass of a desired composition is melted;

(2) the melt is cooled to a glass body;

(3) the glass body is comminuted to a fine powder;

(4) the SiC fibers are implanted in the glass powder;

(5) the fiber/glass powder mixture is formed into a shape of a desired configuration; and thereafter (6) the shape is consolidated into an integral body and crystallized into a glass-ceramic by heating to an elevated temperature, but below the liquidus temperature of the glass.

Various means, such as dry pressing, extrusion, injection molding, hot pressing, and hot isostatic pressing, have been employed in shaping the fiber/glass powder mixture. Hot pressing and hot isostatic pressing make it possible to shape the mixture and simultaneously consolidate the shape, whereas dry pressing, extrusion, and injection molding require a subsequent heat treating step to accomplish consolidation.

However, the preferred method for preparing composite articles containing SiC fibers consists of hot pressing prepregs composed of SiC fibers and glass powders. Hence, the method comprises the following general steps:

(1) continuously unwinding a roll of SiC paper, fabric, yarn, or continuous fiber from a spool through a slurry of powdered glass containing an organic binder to impregnate the fibers;

(2) removing excess slurry from the fibers;

(3) wrapping the impregnated fibers around a rotating drum to produce flat sheets (prepregs) wherein the fibers are held by the organic binder;

(4) cutting the prepregs to conform to the lateral dimensions of the article to be formed;

(5) stacking the cut prepregs to a height to yield the vertical dimensions of the article to be fabricated; (The lay up of the plies of prepregs may be varied in direction to produce different mechanical properties.)

(6) heating the stacked prepregs to burn out the organic binder, typically at temperatures about 300°-500° C.; and (7) consolidating the stacked prepregs into an integral body, and crystallizing that body in situ by pressing at temperatures customarily ranging from about 1250°–1450° C. in a non-oxidizing environment, the load being varied depending upon the viscosity of the matrix material at the temperature employed and the quantity of fiber present. [In general, temperatures up to that at which the glassy matrix exhibits a viscosity of ~$10^2$ poises may be utilized with pressures of about 1000–3000 psi typically being applied over the sintering range of the matrix; that range beginning at the annealing point of the glass ($10^{13}$ poises) and extending up to about the $10^2$ poise viscosity temperature. As would be expected, higher pressing loads are required at lower temperatures where the viscosity of the matrix is higher.] Fiber contents between about 15–70% by volume have been found to yield composites with preferred mechanical properties.

In like manner to the observation made above with respect to whisker-containing composites, although the glasses of the alkaline earth aluminosilicate compositions of the instant invention normally crystallize in situ to highly crystalline glass-ceramic bodies during the consolidation hot pressing, a second heat treatment may optionally be undertaken to insure complete crystallization. This second heat treatment may be included as part of the consolidation process or as a separate step. Temperatures between about 1100°–1300° C. typically suffice for this second treatment.

Table VIII records six thermally crystallizable glass compositions, expressed in terms of parts by weight on the oxide basis, which, when subjected to the heat treatment practice of the present invention, will crystallize in situ to relatively uniform fine-grained glass-ceramic bodies. Inasmuch as the sum of the individual constituents totals or closely approximates 100, for all practical purposes the cited values may be considered to reflect weight percent. The specific batch ingredients may comprise any materials, either oxides or other compounds, which, when fused together, will be converted into the desired oxide in the proper proportions.

The batch components were compounded, ballmilled together to assist in achieving a homogeneous melt, melted for 16 hours at 1650° C. in platinum crucibles, and the melt run as a fine stream into a container of water to form particles of glass. After drying, the glass particles were ballmilled to produce an average particle size of between about 10–40 microns and screened through a No. 100 U.S. Standard Sieve to remove tramp large particles.

TABLE VIII

|  | 3 | 21 | 29 | 30 | 31 | 32 |
|---|---|---|---|---|---|---|
| $SiO_2$ | 41.0 | 40.8 | 42.8 | 44.8 | 47.2 | 48.9 |
| $Al_2O_3$ | 39.5 | 39.7 | 36.3 | 36.3 | 35.8 | 35.4 |
| CaO | 18.5 | 19.0 | 20.0 | 16.1 | 10.1 | 6.1 |
| MgO | — | — | — | 2.8 | 6.9 | 9.7 |
| $As_2O_3$ | 1.0 | 0.5 | 1.0 | 0.5 | 0.5 | 0.5 |

A slurry of the glass powder in a 92.5 weight percent isopropyl alcohol—7.5 weight percent water solution was prepared and about 6% by weight polyvinyl acetate added to form a binder system.

A yarn of continuous SiC fibers was passed through an oxidizing flame to remove the organic sizing agent thereon and then moved through a bath of the above slurry to pick up the glass powder. After removing excess slurry, the yarn was wound around a rotating drum to form a sheet (prepreg) having a unidirectional fiber orientation; the fibers being bonded together by the polyvinyl acetate binder.

The prepreg was dried at room temperature and discs having a diameter of about 3" cut therefrom. The discs were stacked in a steel tray in a uniaxial orientation and the tray then introduced for two hours into an oven operating at 450° C. and having an atmosphere of flowing air to remove the organic components.

The stack of prepreg plies was thereafter inserted into a graphite mold and the mold placed into a resistance-heated press capable of operating in the presence of a controlled atmosphere. The stack of plies was subsequently consolidated by pressing for 10 minutes at 1340° C. in a nitrogen atmosphere under a load of 2000 psi. To insure complete crystallization in situ, the mold was cooled to 1200° C. and held at that temperature for two hours.

The fiber contents of the several composite compositions ranged about 30 to 35% by volume. X-ray diffraction analyses identified anorthite as the predominant crystal phase in Examples 3, 21, 29, and 30 and indicated Examples 31 and 32 to contain a mixture of anorthite and cordierite.

Table IX reports the modulus of rupture (MOR in psi), Young's modulus in bending ($10^6$ psi), and microcrack yield stress (MCY in psi) as a function of the temperature at which the composite body was tested.

The microcrack yield stress (MCY) is the flexural stress on the composite when the glass-ceramic matrix begins to microcrack resulting from the fact that the elongation strain of the fibers is much higher than that of the matrix (~1.5–~0.1%). After the MCY point is passed, the share of the load increases on the fibers while the Young's modulus of the matrix decreases. Stated in another way, the MCY point comprises the stress where the curve becomes non-linear. At the ultimate stress or MOR value, the fibers carry all of the load.

A measurement of the MCY can be extremely critical since, depending upon the application a product is intended to serve and/or the environmental conditions a product may experience in service, it may constitute the design limit of the composite. It is quite apparent, then, that for many applications it is important to have as high a level of MCY stress as possible. Practical means to raise that level include increasing the volume fraction of fibers in the matrix, utilizing fibers exhibiting higher Young's modulus, and enhancing the fracture energy (toughness) of the matrix.

It will be appreciated that MCY stress cannot be measured on whisker-reinforced composites inasmuch as the length of the whiskers is too short to prevent such bodies from sharply breaking in like manner to monolithic glass-ceramic bodies.

TABLE IX

| Example | Temperature | MOR | Young's Modulus | MCY |
|---|---|---|---|---|
| 3 | 25° C. | 159,000 | 14.8 | 41,600 |
|  | 900° C. | 37,200 | 13.0 | 29,400 |
|  | 1100° C. | 36,600 | 12.3 | 33,400 |
|  | 1200° C. | 40,000 | 11.4 | 25,600 |
|  | 1300° C. | 46,200 | 7.8 | 12,000 |
|  | 1350° C. | 43,700 | — | — |
| 21 | 25° C. | 109,000 | 17.7 | 38,600 |
|  | 900° C. | 43,700 | 16.5 | 40,500 |
|  | 1100° C. | 45,800 | 14.3 | 40,900 |
|  | 1200° C. | 52,700 | 12.6 | 15,300 |
|  | 1300° C. | 52,200 | 9.8 | 7,200 |
| 29 | 25° C. | 144,000 | 15.0 | 31,600 |
|  | 900° C. | 32,800 | 12.8 | 28,200 |
|  | 1100° C. | 32,400 | 11.6 | 31,100 |
|  | 1300° C. | 45,100 | 7.0 | 6,300 |

TABLE IX-continued

| Example | Temperature | MOR | Young's Modulus | MCY |
|---|---|---|---|---|
| 30 | 25° C. | 79,700 | 20.5 | 51,800 |
| | 900° C. | 61,500 | 17.6 | 32,700 |
| | 1100° C. | 45,700 | 16.0 | 35,400 |
| | 1200° C. | 46,400 | 13.3 | 31,200 |
| | 1250° C. | 56,600 | 11.6 | 16,600 |
| | 1300° C. | 35,000 | 9.5 | 7,800 |
| 31 | 25° C. | 96,100 | 20.7 | 47,000 |
| | 900° C. | 53,600 | 17.4 | 29,800 |
| | 1100° C. | 44,000 | 16.5 | 32,900 |
| | 1200° C. | 46,900 | 13.8 | 29,400 |
| | 1250° C. | 51,000 | 11.9 | 16,800 |
| | 1300° C. | 42,400 | 10.0 | 4,300 |
| 32 | 25° C. | 100,500 | 21.2 | 53,100 |
| | 900° C. | 47,400 | 18.2 | 28,100 |
| | 1100° C. | 40,800 | 16.9 | 34,400 |
| | 1200° C. | 42,400 | 13.8 | 33,200 |
| | 1250° C. | 44,900 | 11.8 | 13,200 |
| | 1300° C. | 40,100 | 10.5 | 5,700 |

As can be observed from Table IX, the mechanical strength of the inventive composites remains high at least up to 1350° C. It is also of interest to note that the mechanical strength at temperatures in the range of about 1100°–1250° C. is frequently greater than that demonstrated at lower temperatures. That phenomenon is believed to be the result of crack healing taking place as the Young's modulus of the matrix is decreasing within that range of temperatures.

Formation of Hybrid Composite Articles Containing SiC Whiskers and Fibers

A homogeneous suspension containing 15% by weight whiskers was prepared from a frit obtained from Example 21, utilizing the above-described shear mixing technique. The dried mixture was then blended into the organic binder and vehicle solution to form a slurry as is also described above with respect to the fiber composites. After exposing to an oxidizing flame, a yarn of continuous SiC fibers was passed through a bath of the slurry to pick up the glass powder and whiskers and, after removing any excess slurry, wound onto a mandrel to form a sheet (prepreg) exhibiting unidirectional fiber orientation. The prepreg was cut into plies of a desired size, stacked, and the organic components burned out. The prepreg stack was hot pressed in a graphite mold for 10 minutes at 1340° C. under a load of 2000 psi in an atmosphere of flowing nitrogen. The mold was subsequently cooled to 1200° C. and maintained at that temperature for two hours to insure complete crystallization. The fiber content of the final body averaged about 35% by volume.

As measured at 25° C., the hybrid composite exhibited a modulus of rupture of about 72,000 psi, a Young's modulus of about $20.1 \times 10^6$ psi and a microcrack yield stress of about 62,200 psi. Those levels compare with a modulus of rupture of about 109,000 psi, a Young's modulus of about $17.7 \times 10^6$ psi, and a microcrack yield stress of about 38,600 psi measured at 25° C. on the composite of Example 21 containing fibers only (Table IX). As can be observed, the incorporation of whiskers into the fiber-containing composite raised the Young's modulus and microcrack yield stress of the composite.

A further comparison may be made between the hybrid composite and the glass-ceramic matrix alone and a whisker-containing glass-ceramic composite. For example, Example 21 with no additions exhibits a modulus of rupture of about 15,000 psi and a Young's modulus of about $13 \times 10^6$ psi, when measured at 25° C. Example 21 with 30% by weight whiskers demonstrated a modulus of rupture of about 53,800 psi and a Young's modulus of about $23 \times 10^6$ psi, when measured at 25° C. (Table VI).

Whereas the above description of hybrid composites utilized SiC fibers (and the use of such fibers comprises the preferred embodiment), it will be appreciated that other ceramic fibers can be utilized in like manner. Examples of operable fibers include SiC, $B_4C$, graphite, mullite, spinel, alumina, BN, $ZrO_2$, zircon, and glass.

We claim:

1. A whisker reinforced glass-ceramic matrix composite body having a use temperature up to 1300° C. consisting essentially of 10–60% by weight deagglomerated SiC whiskers having a thickness less than 100 microns with a length-to-diameter ratio of at least 10 substantially uniformly distributed in a glass-ceramic matrix consisting essentially, expressed in terms of weight percent on the oxide basis, of

| | | | |
|---|---|---|---|
| CaO | 0–25 | MgO | 0–15 |
| SrO | 0–30 | $Na_2O$ | 0–4 |
| CaO + SrO | 10–30 | $K_2O$ | 0–6 |
| $Al_2O_3$ | 25–38 | $TiO_2$ | 0–12 |
| $SiO_2$ | 35–60 | $ZrO_2$ | 0–15 |
| BaO | 0–25 | $As_2O_3$ | 0–3 |
| BaO + MgO + $Na_2O$ + $K_2O$ + $TiO_2ZrO_2$ + $As_2O_3$ | | | 0–30 | wherein the predominant crystal phase in the glass-ceramic matrix is selected from the group of anorthite and its pseudo-binaries with mullite ($3Al_2O_3.2SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.SiO_2$, and gehlenite ($2CaO.Al_2O_3.SiO_2$).

2. A fiber reinforced glass-ceramic matrix composite body having a use temperature up to 1300° C. consisting essentially of 15–70% by volume SiC fibers substantially uniformly distributed in a glass-ceramic matrix consisting essentially, expressed in terms of weight percent on the oxide basis, of

| | | | |
|---|---|---|---|
| CaO | 0–25 | MgO | 0–15 |
| SrO | 0–30 | $Na_2O$ | 0–4 |
| CaO + SrO | 10–30 | $K_2O$ | 0–6 |
| $Al_2O_3$ | 25–38 | $TiO_2$ | 0–12 |
| $SiO_2$ | 35–60 | $ZrO_2$ | 0–15 |
| BaO | 0–25 | $As_2O_3$ | 0–3 |
| BaO + MgO + $Na_2O$ + $K_2O$ + $TiO_2ArO_2$ + $As_2O_3$ | | | 0–30 | wherein the predominant crystal phase in the glass-ceramic matrix is selected from the group of anorthite and its pseudo-binaries with mullite ($3Al_2O_3.2SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.SiO_2$, and gehlenite ($2CaO.Al_2O_3.SiO_2$).

3. A fiber and whisker reinforced glass-ceramic matrix hybrid composite body having a use temperature up to 1300° C. consisting essentially of about 15–70% by volume fibers selected from the group of SiC, graphite, $B_4C$, BN, mullite, spinel, $ZrO_2$, zircon, glass, and alumina and 10–60% by weight deagglomerated SiC whiskers having a thickness less than 100 microns with a length-to-diameter ratio of at least 10 substantially uniformly distributed in a glass-ceramic matrix consisting essentially, expressed in terms of weight percent on the oxide basis, of

| | | | |
|---|---|---|---|
| CaO | 0–25 | MgO | 0–15 |
| SrO | 0–30 | Na$_2$O | 0–4 |
| CaO + SrO | 10–30 | K$_2$O | 0–6 |
| Al$_2$O$_3$ | 25–38 | TiO$_2$ | 0–12 |
| SiO$_2$ | 35–60 | ZrO$_2$ | 0–15 |
| BaO | 0–25 | As$_2$O$_3$ | 0–3 |

-continued

| | |
|---|---|
| BaO + MgO + Na$_2$O + K$_2$O + TiO$_2$ZrO$_2$ + As$_2$O$_3$ | 0–30 | wherein the predominant crystal phase in the glass-ceramic matrix is selected from the group of anorthite and its pseudo-binaries with mullite (3Al$_2$O$_3$.2SiO$_2$), cordierite (2MgO.2Al$_2$O$_3$.5SiO$_2$), barium osumilite (BaO.2MgO.3Al$_2$O$_3$.9SiO$_2$), and albite solid solution (Na$_2$O.Al$_2$O$_3$.6SiO$_2$).

* * * * *

UNITED STATES PATENT AND TRADEMARK OFFICE
CERTIFICATE OF CORRECTION

PATENT NO. : 4,615,987

DATED : October 7, 1986

INVENTOR(S) : Kenneth Chyung et al.

It is certified that error appears in the above-identified patent and that said Letters Patent is hereby corrected as shown below:

Column 6, line 10 (under Example 19), change "1.9" to --0.9--.

Column 14, line 30, after "anorthite" insert
--[(CaO,SrO)·$Al_2O_3$·$2SiO_2$]--.

Column 14, line 52, after "anorthite" insert
--[(CaO,SrO)·$Al_2O_3$·$2SiO_2$]--.

Column 16, line 6, after "anorthite" insert
--[(CaO,SrO)·$Al_2O_3$·$2SiO_2$]--.

Signed and Sealed this

Twenty-eighth Day of April, 1987

Attest:

DONALD J. QUIGG

Attesting Officer

Commissioner of Patents and Trademarks